United States Patent [19]

Leib et al.

[11] Patent Number: 5,172,279

[45] Date of Patent: Dec. 15, 1992

[54] PRECISION FILM INPUT GATE

[75] Inventors: Kenneth G. Leib, Wantagh; Edward V. Sullivan, Hunt. Station, both of N.Y.

[73] Assignee: Grumman Aerospace Corporation, Bethpage, N.Y.

[21] Appl. No.: 846,619

[22] Filed: Mar. 5, 1992

[51] Int. Cl.[5] .............................................. G02B 7/00
[52] U.S. Cl. ................................... 359/894; 359/896; 359/801; 359/806
[58] Field of Search ............... 359/885, 889, 891, 892, 359/894, 896, 819, 813, 805, 806, 802

[56] References Cited

U.S. PATENT DOCUMENTS

| 3,707,052 | 12/1972 | Clark | 359/801 |
|---|---|---|---|
| 3,809,468 | 5/1974 | Moritz | 359/806 |
| 3,994,008 | 11/1976 | Land et al. | 359/892 |
| 4,030,833 | 6/1977 | Barbieri | 359/889 |
| 4,422,738 | 12/1983 | Steele | 359/806 |
| 4,491,434 | 1/1985 | Barr et al. | 359/806 |
| 4,594,788 | 6/1986 | Abergel | 359/806 |
| 4,652,095 | 3/1987 | Mauro | 359/813 |
| 4,703,994 | 11/1987 | Leib et al. | 359/19 |
| 4,746,955 | 5/1988 | Slayton et al. | 359/889 |
| 4,802,718 | 2/1989 | Leib et al. | 359/1 |
| 4,929,056 | 5/1990 | Leib et al. | 359/896 |

Primary Examiner—Loha Ben
Attorney, Agent, or Firm—Pollock, VandeSande & Priddy

[57] ABSTRACT

An elongated enclosure includes a number of apertures through which a film must be precisely viewed. A slider receives a removable film holder into which a film, such as a 35 mm slide is positioned. A precision recirculating bearing assembly provides accurate and smooth motion of the slider within the housing. A number of alignment components are located in the device to repeatedly and accurately position the film, relative to the apertures. Thus, a laser beam or optical axis can repeatedly and precisely pass through the same point of the image as it appears in a corresponding aperture.

7 Claims, 4 Drawing Sheets

PRECISION FILM INPUT GATE

FIELD OF THE INVENTION

The present invention relates to photographic film holding devices, and more particularly to a high precision fixture for accurately locating a developed photographic image at plural points for analog optical correlation.

BACKGROUND OF THE INVENTION

In order to use certain types of analog optical correlator technology, it is important to locate film (e.g., 35 mm—4"×5") at a precise point of interest. For example, it is usually necessary to locate film in a plane perpendicular to a laser beam in order to complete correlator operation. Since the positioning of the film at a point of interest requires extremely high precision for proper operation, normal film carriages will not suffice.

BRIEF DESCRIPTION OF THE PRESENT INVENTION

The present invention is a film input gate which allows film to be held within a slider that precisely and repeatedly positions the film at predetermined points along the slider displacement. The mechanism of the present invention assures that the film can be removed, reloaded, or replaced and re-inserted to exact points of interest, each time.

Accordingly, the present invention is directed to a precision alignment device for locating 35 mm or larger film formats accurately with consistent and precise repeatability to one or more points of interest along the plane of the film. The film holding slider incorporated in the present invention travels along precision recirculating bearings which makes displacement of the slider extremely smooth and relatively effortless. The high precision nature of the present invention allows the device to be used in laboratory set-ups or included in a functional and operating optical correlator. Adjustments are provided to allow decoupled x and y adjustments. As will be appreciated from the following description of the invention, the alignment device offers the user excellent results and is extremely stable, since there are no welded or fastened seams.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
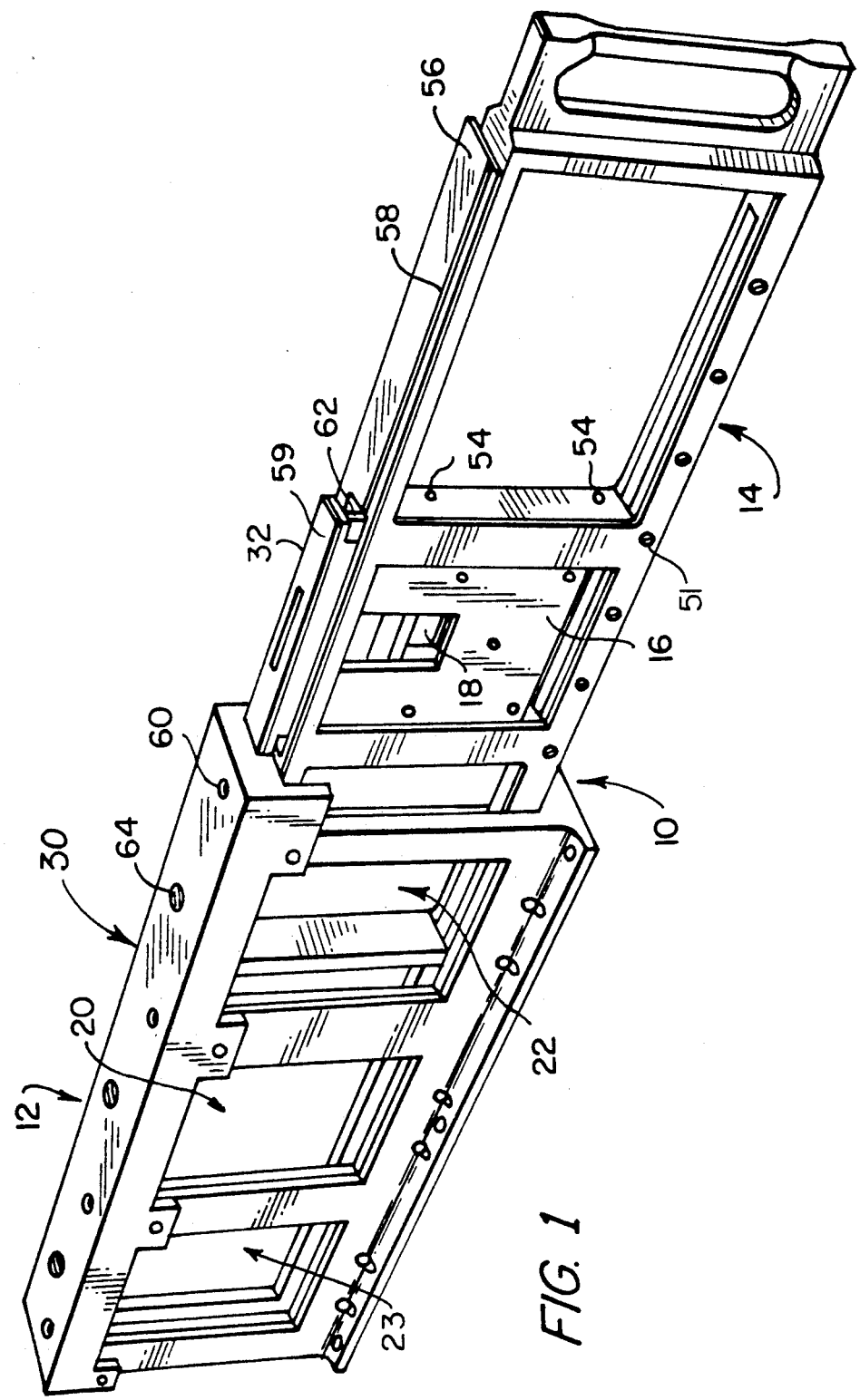
FIG. 1 is a perspective view of the present invention illustrating a film holder in a deposited position.
Figure 2:
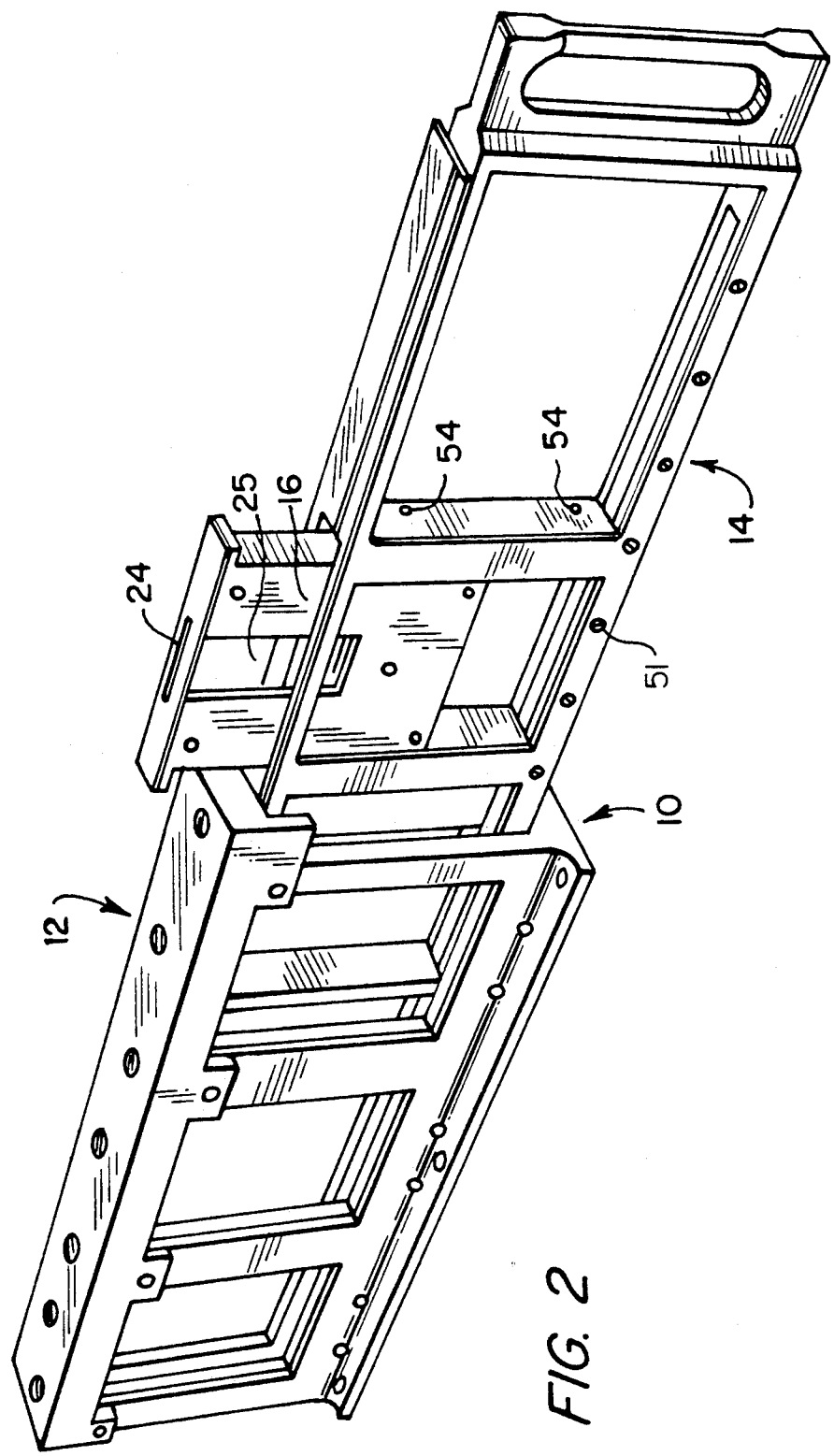
FIG. 2 is a view similar to that of FIG. 1 showing the film holder in a partially retracted position.

Referring to FIG. 1, the primary components of the present film input gate 10 is generally seen to include an elongated housing 12 into which a slider 14 is stepped to assume several precise and repeatable positions whereby a film holder 16, holding a film 18, becomes precisely aligned in a first window 22 and then in a second window 20. If necessary, a third window 23 (FIG. 3) may be included. FIG. 1 illustrates the film holder 16 as being inserted within the frame of the slider 14 in preparation of insertion into housing 12. On the other hand, FIG. 2 illustrates the partial withdrawal of the film holder 16 such as when it is being pulled out or replaced into the slider 14. In order to change the film, such as a 35 mm slide in the film holder, a slot 24 is formed at the upper edge of the film holder thereby allowing the slide to be replaced by urging the film outwardly from the slot 24 via the recess 25 which exposes the inserted film to manual manipulation. If 4"×5" film is to be used, another holder, similar to 16, would be inserted and would include a larger slot 24 and recess 25.

Figure 3:
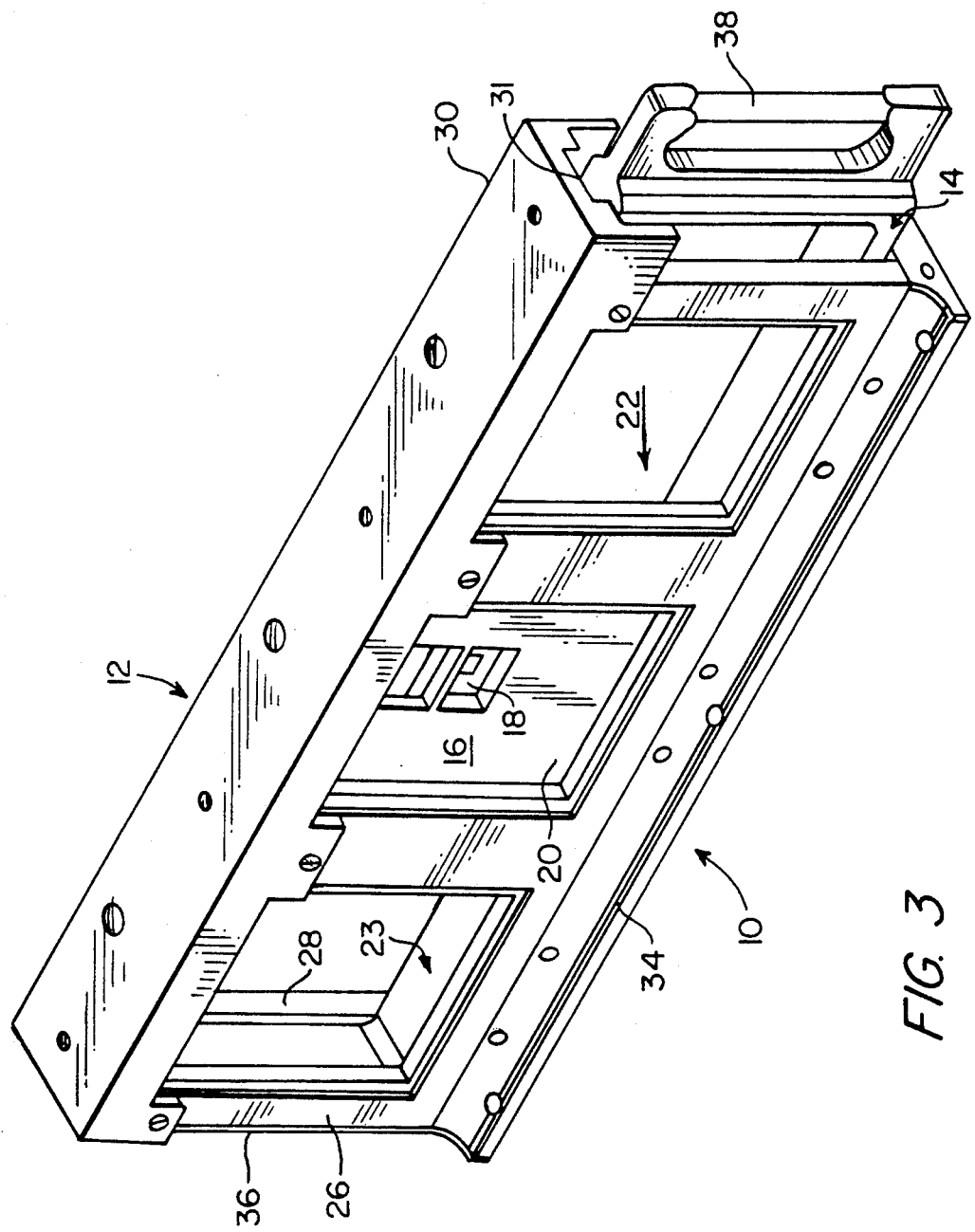
FIG. 3 is a perspective view illustrating the slider component of the present invention in a fully inserted position.

Referring to FIG. 3 the enclosure is seen to include a first apertured side panel 26 spaced from a rearwardly, similarly apertured side panel 28. In the embodiment shown in FIG. 3, three rectangular apertures 22, 20, and 23 exist from right to left. By inserting slider 14 into the enclosure 12, in a step-like fashion, the film 18 will be sequentially and precisely positioned at exact points within each of the apertures. At these points, the film 18 will be at precisely desirable points relative to a laser beam, lens optical axis, detector axis, or the like.

FIG. 3 illustrates the inclusion of a cover plate 30 as part of the enclosure 12. The cover plate has a keyed entry at 31 for guiding the slider 14 into the enclosure 12. More particularly, the entry is keyed to the profile of film holder shoulder 32, as clearly shown in FIG. 1.

Figure 5:
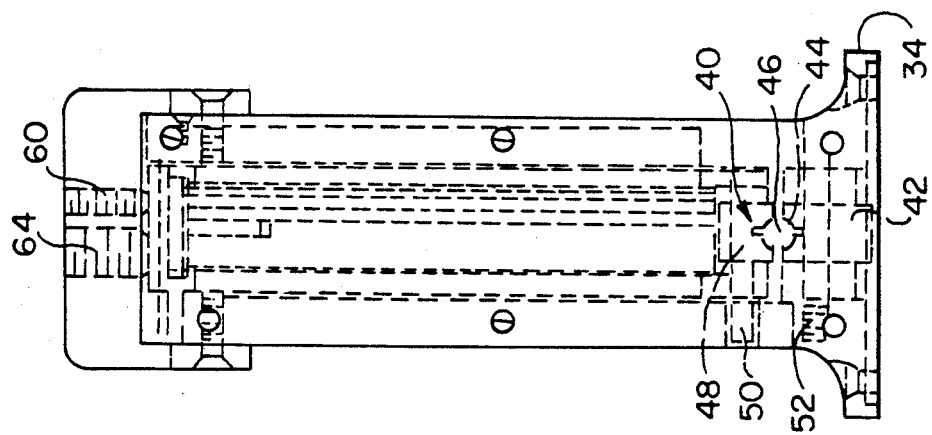
FIG. 5 is an end view of the present invention from the end opposite the slider entry way.
Figure 4:
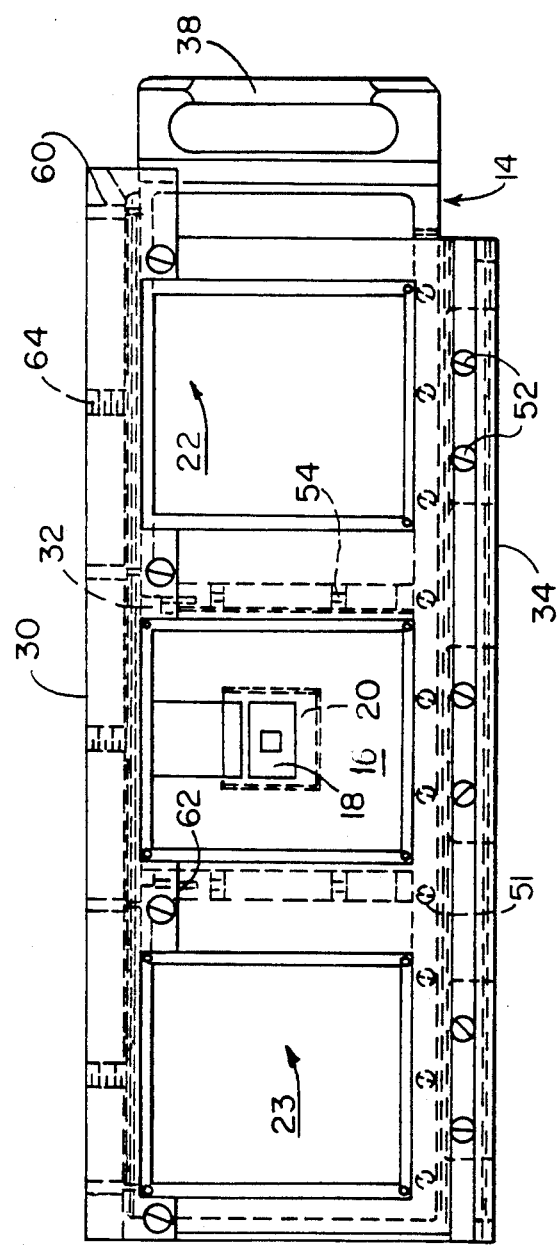
FIG. 4 is a front elevational view illustrating the slider component of the present invention in a fully inserted position.

FIGS. 4 and 5 illustrate the inclusion, at a lower end of the device, of a conventional precision recirculating bearing assembly generally indicated by reference numeral 40. The assembly includes a lower roller track 42 extending along the base 34 (FIGS. 3–5) of the device housing. The upper surface of the roller track has a V-shaped groove 44 along which the recirculating bearings 46 travel. A matching track 48 is secured to the lower surface of the slider 14. Thus, when the slider is moved into the enclosure, the recirculating bearings ensure smooth and precise positioning of the slider. In FIGS. 1, 2, and 4, a row of fasteners 51 secures track 48 to the slider 14. FIG. 5 indicates a convenient safety stop 50. Detent pins (not shown) are located below each of the enclosure apertures 20, 22, and optionally 23. These detent pins engage recesses formed along a correspondingly positioned section of the slider 14 so as to precisely position the film holder 16 centrally of each aperture. Fasteners 52 secure roller track 42 in position. A series of alignment pins 54 shown in FIGS. 1, 2, and 4 serve to align the film holder 16 in a horizontal position relative to the slider itself.

FIG. 1 indicates an elongated linear groove 58 existing along the top edge 56 of the slider 14. A corresponding groove 59 in the film holder shoulder 32 is linearly aligned with groove 58, the grooves 58 and 59 becoming engaged by sequentially spaced ball plungers 60 (FIG. 5) which guide and align the slider 14 as it is pushed into the housing 12.

Similar types of ball plungers 64 are indicated in the figures as contacting a central point of the film holder shoulder 32 as the holder is positioned centrally in each of the apertures. The plungers 64 are adapted to maintain the film holder 16 in a completely and precisely positioned inserted location, relative to the slider 14.

In order to partially withdraw the film holder 16 from the slider 14 so that one can easily grasp and remove it, spring-loaded pins 62 (FIGS. 1, 4) are provided for developing upward biasing force on the shoulder 32 of the film holder 16. The biasing force of these pins is overcome by screws 60 and 64 located along the top edge of the enclosure 12 when the slider 14 is pushed into the enclosure.

Thus, by virtue of the foregoing description, it will be appreciated that the present invention offers a means for precisely positioning film relative to the optical axis of a laser beam, lens, detector, or the like. The invention offers precision so that an image may be repeatedly repositioned in several apertures with a very high degree of locational accuracy.

It should be understood that the invention is not limited to the exact details of construction shown and described herein for obvious modifications will occur to persons skilled in the art.

I claim:

1. A fixture for precisely positioning a film member at plural positions comprising:
    an elongated enclosure having a plurality of apertures passing therethrough;
    a slider removably received in the enclosure and adapted for precise positioning at preselected points along its travel into the enclosure;
    a film holder removably mounted in the slider for securely holding a film medium in the slider;
    an aperture formed in the slider and surrounding the film medium to allow light to freely pass therethrough after passing through a respective aperture in the enclosure, when the slider is positioned at a preselected point in the enclosure;
    recirculating bearing means connected between an internal surface of the enclosure and an opposing surface of the slider for precisely positioning the opposing surface relative to the enclosure as the slider is smoothly pushed into the enclosure;
    means for normally biasing the film holder outwardly of the slider to facilitate its removal when the slider is withdrawn from the enclosure; and
    means for camming the film holder into precise engagement with the slider when the latter is inserted into the enclosure thereby overcoming the biasing of the film holder.

2. The fixture set forth in claim 1 wherein the slider includes
    a frame having a base member for mounting a first grooved rail of the bearing means;
    an opposing surface of the enclosure base mounting a matching grooved rail; and
    roller balls riding in the grooves of the opposing rails.

3. The fixture set forth in claim 1 wherein the slider is provided with spring loaded pins normally contacting an undersurface of a film holder shoulder thereby providing its normal outward biasing.

4. The fixture set forth in claim 1 wherein the camming means comprises spring loaded pins located in the enclosure and extending inwardly thereof for contacting a confronting surface of the film holder shoulder and exerting a force thereon sufficient to overcome the outward bias on the shoulder.

5. A film input gate for precisely positioning a film member at preselected locations along a linear direction, the film gate comprising:
    an elongated enclosure having a plurality of windows formed therein which corresponds in number to the number of preselected locations;
    a slider removably received in the enclosure and adapted for precise positioning within the enclosure at the preselected locations;
    a film holder removably mounted in the slider for securely holding a film medium in the slider;
    first spring loaded pins normally contacting an undersurface of a film holder shoulder thereby providing an outward displacement of the holder when it is displaced from the enclosure;
    an aperture formed in the slider and surrounding the film medium to allow light to freely pass therethrough after passing through a respective aperture in the enclosure, when the slider is positioned at a preselected point in the enclosure;
    recirculating bearing means connected between an internal surface of the enclosure and an opposing surface of the slider for precisely positioning the opposing surface relative to the enclosure as the slider is smoothly pushed into the enclosure;
    second spring loaded pins located in the enclosure and extending inwardly thereof for contacting a confronting surface of the film holder shoulder and exerting a force thereon sufficient to overcome the outward bias on the shoulder thereby urging the film holder into precise engagement with the slider when the latter is inserted into the enclosure and overcoming the outward biasing of the film holder; and
    third spring loaded pins located in the enclosure and extending inwardly thereof for contacting a confronting surface of the slider for exerting a force along this surface and urging the slider into intimate contact with the bearing means, thereby precisely locating the entire length of the slider relative to the enclosure.

6. The fixture set forth in claim 5 wherein the slider includes a frame having a base member for mounting a first grooved rail of the bearing means, an opposing surface of the enclosure base mounting a matching grooved rail; and roller balls riding in the grooves of the opposing rails.

7. The fixture as set forth in claim 6 wherein one end of the slider has a handle connected thereto for facilitating movement of the slider in and out of the enclosure.

* * * * *